Aug. 30, 1932.    J. W. AUREN    1,874,152
RESILIENT SHAFT COUPLING
Filed Dec. 19, 1930
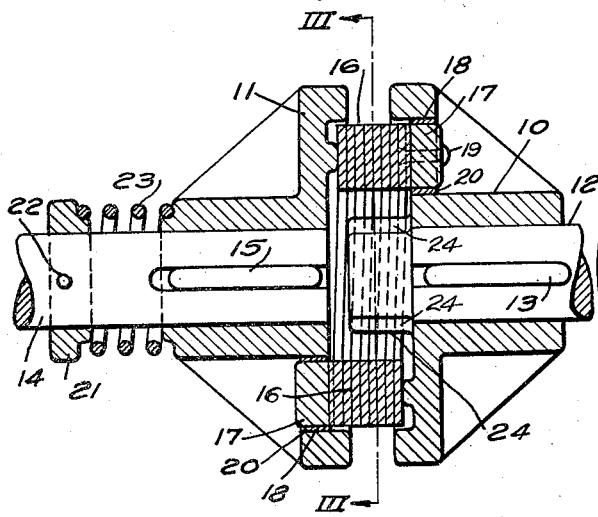
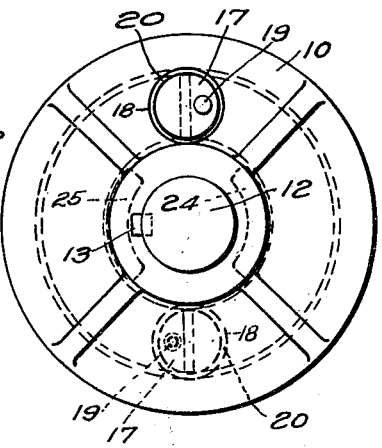
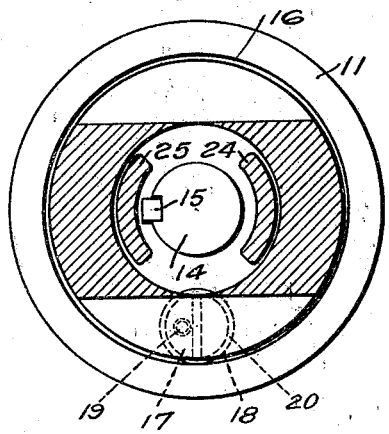
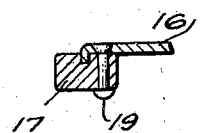
INVENTOR
John W. Auren.
BY
ATTORNEY Patented Aug. 30, 1932

1,874,152

UNITED STATES PATENT OFFICE

JOHN W. AUREN, OF FOREST HILLS, PENNSYLVANIA, ASSIGNOR TO WESTINGHOUSE ELECTRIC & MANUFACTURING COMPANY, A CORPORATION OF PENNSYLVANIA

RESILIENT SHAFT COUPLING

Application filed December 19, 1930. Serial No. 503,416.

This invention relates to coupling devices, and particularly to shaft couplings for effecting connection between a driving shaft and a driven shaft.

The object of my invention is to provide in a shaft coupling a resilient connection between the driving and the driven members.

A further object of the invention is to provide a coupling which gives torsional resilience in the transmission of power and which inherently tends to damp out vibrations set up by abrupt fluctuations in either the power or the load.

Another object of my invention is to provide a coupling of the type described which compensates for misalignment between the coupled shafts and which is simple in design, reliable in operation, and can be economically manufactured.

Other objects of my invention will become evident from the following detailed description taken in conjunction with the following drawing, in which Figure 1 is a longitudinal sectional view, of a preferred form of coupling constructed in accordance with this invention.

Fig. 2 is a view in end elevation of the coupling.

Fig. 3 is a sectional view taken along the line III—III of Fig. 1.

Fig. 4 is a view in sectional elevation showing details of an end securing stud for the torsion spring of the coupling.

Referring to the drawing, particularly Fig. 1, it will be seen that the coupling comprises a driving member 10 and a driven member 11. As shown the driving member is keyed to a driving shaft 12 in the usual manner by means of a key 13. The driven member is splined to the end of a driven shaft 14 by means of a feathered key 15 so that it rotates with the shaft and is free to slide in an axial direction on the shaft, for a purpose to be made evident. It will be apparent, however, that if desired the opposite arrangement, in which the driving member is splined and the driven member keyed to its respective shaft, may be utilized. In the description which follows, the first named arrangement will, however, be assumed.

In order to provide for angular or torsional flexibility in the coupling, a coiled torsion spring 16 is utilized to connect the driving and the driven members. As shown, the spring is rectangular in cross-section and wound on edge into coils the turns of which are of substantially equal diameter, with little or no space being allowed between them. It will be understood that the dimensions and number of turns in this spring are dependent upon the torque capacity and flexibility characteristics desired in the coupling.

To permit compensation for shaft misalignments, the ends of the torsion spring 16 are pivotally connected to the driving member 10 and driven member 11. As illustrated, attached to each end of the spring is a stud 17 which fits into a bushed hole 18 suitably located in the coupling members. As shown in Fig. 4, the stud 17 is slotted at one end, and in assembling, the end of the torsion spring 16 is inserted into the stud slot and bent at a right angle, to contact with a portion of the stud, and is fixed thereto by a rivet 19.

A bushing 20 is mounted in each hole 18, already referred to, to provide a close fitting connection between the stud 17 and the coupling member. They may be replaced should this part of the device be subjected to excessive wear.

To provide for the damping out of torsional vibrations, such as are set up in flexible couplings when the power or the load fluctuates abruptly, I incorporate in my device means for compressing the torsion spring 16, to bring the adjacent turns into contact. Frictional resistance to the relative movement between adjacent turns is thus set up and any torsional vibrations are thus greatly minimized or completely damped out.

As illustrated, the spring 16 may be compressed by fixing to the driven shaft 14, in spaced relation to the driven member 11, a collar 21 by means of a pin 22. A coil spring 23 in compression is mounted between the collar and the driven member. Since the driven member 11 is splined to the driven shaft it is biased against the spring 23 causing frictional engagement between the turns of the spring with the results and advantages already explained.

The torsion spring is protected from unsafe strain, such as might result from severe torque overloads, by providing an angular displacement limiting projection, upon each coupling member, as shown, at 24 on the driving member, and at 25 on the driven member. It will be seen that these projections will be brought into contact when the coupling members are angularly displaced beyond a predetermined amount.

While I have shown and described a certain specific embodiment of my invention, I am fully aware that many modifications thereof are possible. My invention, therefore, is not to be restricted except insofar as is necessitated by the prior art and by the spirit of the appended claims.

I claim as my invention:

1. A shaft coupling comprising in combination a driving member and a driven member, a torsion spring for resiliently connecting said driving and driven members, said spring being formed from material of rectangular cross section into coils having adjacent turns of substantially equal diameters, and means for continuously compressing said spring axially to bring adjacent turns thereof into contact to cause frictional resistance to relative movement therebetween.

2. A shaft coupling comprising in combination a driving member and a driven member, a torsion spring for resiliently connecting said driving and driven members, said spring having axially contactable adjacent turns, pivotal connections for attaching the ends of the spring to said driving and driven members respectively, and means for continuously compressing said spring axially to force adjacent turns thereof into contact to cause frictional resistance to relative movement therebetween.

3. A shaft coupling comprising in combination a driving member and a driven member, a coiled torsion spring having axially contactable adjacent turns, for resiliently connecting said driving and driven members, axial projections on the driving and driven members disposed to engage one another when the angular displacement of the members reaches a predetermined value, and means for continuously compressing said spring axially to force adjacent turns thereof into contact to cause frictional resistance to relative movement of the turns.

4. A shaft coupling, in combination with a driving shaft and a driven shaft, comprising a driving member and a driven member, said driving member being firmly keyed to the driving shaft, said driven member being splined to the driven shaft to rotate therewith and to be free to axially slide thereon, a coiled torsion spring disposed to resiliently connect said driving and driven members, a collar fixed to the driven shaft and a coil spring held by said collar in compression against the driven member to compress the torsion spring to bring adjacent turns thereof into contact for causing frictional resistance to relative movement therebetween.

5. A shaft coupling, for connecting a driving shaft and a driven shaft, comprising in combination a driving member and a driven member, a torsion spring for resiliently connecting said driving and driven members, said spring being formed from material of rectangular cross section into coils having adjacent turns of substantially equal diameters and attached at its ends to the driving and driven members respectively through pivotal connecting means, one of said members being firmly keyed to one of said shafts, the other of said members being splined to the other of said shafts to rotate therewith and to be free to axially slide thereon, a collar fixed to the last-named shaft and a coil spring held by said collar in compression against the last-named member to compress the torsion spring and bring adjacent turns thereof into contact for causing frictional resistance to relative movement therebetween.

6. A shaft coupling, for connecting a driving shaft and a driven shaft, comprising in combination a driving member and a driven member, a torsion spring for resiliently connecting said driving and driven members, said spring being formed with axially-contactable adjacent turns, means for attaching the ends of the spring to said driving and driven members respectively, one of said members being firmly keyed to the one of said shafts, the other of said members being splined to the other of said shafts to rotate therewith and to be free to axially slide thereon, a collar fixed to the last-named shaft and a coil spring held by said collar in compression against the last-named member to compress the torsion spring to bring adjacent turns thereof into contact for causing frictional resistance to relative movement therebetween, and axial projections on the driving and driven members disposed to engage one another when the angular displacement reaches a predetermined value.

In testimony whereof, I have hereunto subscribed my name this 12th day of December, 1930.

JOHN W. AUREN.